United States Patent Office 3,361,569
Patented Jan. 2, 1968

3,361,569
PROCESS FOR PREPARING FERMENTED MALT BEVERAGES BY UTILIZING HOP EXTRACT AS A SOLE MEANS FOR IMPARTING THE DESIRED HOP FLAVOR AND AROMA TO THE BEVERAGE
Emil A. Malick, Bartlesville, Okla., assignor to Phillips Petroleum Company, a corporation of Delaware
No Drawing. Filed Dec. 13, 1963, Ser. No. 330,253
1 Claim. (Cl. 99—31)

ABSTRACT OF THE DISCLOSURE

A fermented malt beverage is prepared wherein a wort is boiled and the resulting wort cooled, fermented, concentrated, and reconstituted, wherein the desired hop flavor and aroma is imparted to the beverage solely by the addition of hop extract after the wort is boiled.

---

This invention relates to a process for preparing fermented malt beverages, such as beer and ale. In another aspect it relates to a process for imparting hop flavor and aroma to such malt beverages.

The process of preparing fermented malt beverages, such as beer and ale, is historically well-established. As practiced in modern breweries, the process comprises, briefly, preparing a "mash" of malt, usually with starchy adjuncts, and heating the mash to solubilize the proteins and convert the starch into sugar and dextrins. The insoluble spent grains are filtered off and washed with hot water and the washings combined with the soluble material and the resulting wort boiled in a brew kettle to inactivate enzymes, sterilize the wort, extract desired hop components from added hops, and coagulate certain protein-like substances. The wort is then strained to remove spent hops, cooled and pitched with yeast and fermented. The fermented brew is then aged and clarified, filtered, and carbonated to produce an alcoholic malt beverage.

Recently it has been discovered that significant savings in brewing, storage and shipping can be gained by the freeze concentration of beer and reconstitution of the resulting concentrate; that the taste, aroma and keeping qualities of the reconstituted beer is as good as, or in some cases better than, the beer produced by the present standard brewing process; and that the useful storage or shelf life of the beer, whether stored in a concentrated or reconstituted state, is greatly increased.

The boiling of the wort with hops in the brew kettle, according to the conventional brewing process, serves to extract hop resins and oils, which components contribute a distinctive aroma and flavor to the malt beverage. In addition, the extracted hop components help to precipitate some undesirable high molecular weight proteins. However, the wort is a poor solvent for hops, and the degree of extraction of hop components is inefficient and not as high as desired. A significant amount of the desired hop components, e.g., one-fourth, are in fact not extracted by the wort and are lost to the brewing process when the spent hops are strained or otherwise separated from the boiled wort. The boiling of the wort with added hops also results in some undesirable resinification of hop oil components, e.g., myrcene, and a significant amount of valuable hop oil is lost during boiling by vaporization. Although extracted hop oils and resins can be added at later stages in the process after fermentation, such extracts are used merely to replace but a fraction of the hop components lost or not extracted during the boiling of the wort, rather than as a substitute for all or a substantial part of the hops added to the wort.

Accordingly, an object of this invention is to provide an improved process for preparing fermented malt beverages. Another object is to provide an improved process for imparting hop flavor and aroma to malt beverages, such as beer and ale. Another object is to overcome the above-mentioned disadvantages attendant the extraction of hop components with boiling wort. Other objects and advantages of this invention will become apparent to those skilled in the art from the following description and accompanying claim.

According to this invention, the distinct hop flavor and aroma desired in fermented malt beverages is obtained by the addition of hop extract downstream of the brew kettle, for example by the addition of said hop extract to the finished sweet wort or to the fermented brew. Where a fermented brew is concentrated by freeze concentration, especially by the Phillips Fractional Crystallization Process, said addition of hop extract can be made to the concentrate or to the reconstituted malt beverage.

Hops generally comprise about 11 to 21 percent resinous material, the most valuable resins being humulone and lupulone, and about 0.15 to 1.5 percent oils, the latter comprising hydrocarbons, such as mono- and sesquiterpenes, and oxygenated compounds, such as alcohols, ketones and esters. Various processes are known for extracting the hop components and are practiced on a commercial scale. The hop resins can be extracted from hop plants with hot water using 0.1 to 0.5 weight percent of an inorganic acid. The essential oil of hops can be obtained by steam distillation of the hop plants. Unless indicated otherwise, the term hop extract covers extracted hop resins and/or extracted hop oils. I prefer to impart the basic hop aroma and flavor by adding extracted hop resins, and to obtain preferential or geographically regional nuances (or differences) in hop flavor and aroma by the further addition of extracted hop oils to the fermented brew. The amount of hop extract added according to this invention can vary widely and stated functionally it will be that amount sufficient to impart a desirable hop flavor and aroma to the finished alcoholic malt beverage.

In preparing the wort, from which the fermented malt beverage is prepared in turn, malt (preferably barley malt) is stirred in the warm water in a "mash tub" or the like, using for example 75 to 100 pounds of malt for every barrel (31 gallons) of water, and the mash thereafter heated to solubilize the proteins and convert the starch into fermentable sugars and dextrins. This mashing operation will last 4 to 8 hours, usually about 6 hours, with two or three 20–30 minute resting periods, one such resting period being right after all the malt is doughed in the mash tub and before the mash is heated, and the other resting period being after the mash is heated and reaches a temperature of 67–70° C. Where cereal adjuncts, such as unmalted barley, corn grits or flakes, rice etc. are used in addition to malt an adjunct mash is prepared, using for example 60 to 100 pounds of dry adjuncts for each barrel of water, in a "cereal cooker" or the like, the adjunct mash boiled for 10–30 minutes. The boiling adjunct mash is mixed with the main malt mash to raise its temperature to said 60–70° C. temperature. The combined mash can be stabilized or "mashed off" by heating to 75–80° C. and stopping enzymatic activity, after which the mash is allowed to settle for 20–30 minutes. The finished mash is a suspension of spent grain in a sugary wort and the spent grain is removed in a "lautering tub" or the like and washed (sparged) with hot water, the washings thereafter being combined with the filtered wort. The foregoing mashing operation is conventional and generally practiced by most breweries in the United States.

(Alternatively, a dilute wort can be prepared by the method disclosed in my copending application, Ser. No. 330,254, filed cocurrent herewith, and such wort thereafter freeze concentrated to produce a concentrated wort having an extract content which permits ready fermentation of the wort.)

The wort is boiled in a "brew kettle" to inactivate enzymes, sterilize the wort, and coagulate protein-like substances, such boiling being generally carried out for ½ to 1 hour. It should be noted that, according to this invention, it is unnecessary to boil the wort with added hops in order to impart a desired hop flavor and aroma to the finished alcoholic malt beverage. The boiled wort, as a consequence, is hop-free. However, a small amount of hops can be added to the wort and boiled therewith, if desired, to help in precipitating some undesirable high molecular weight proteins; this small amount of hops is not sufficient to impart the desired hop flavor and aroma to the alcoholic malt beverage, and the wort produced in this case can still be considered to be hop-free.

The boiled wort is cooled and can be filtered to remove flocculated or coagulated solid material, using the wort cooling and filtering equipment of the prior art.

The clarified, cooled wort is "pitched" with yeast and fermented, using bottom yeast in the case of beer and top yeast in the case of ale. After fermentation is complete, the yeast is removed by filtration or the like and the fermented brew can be thereafter stored to further clarify and age the brew, filtered, stored for further clarification and aging, and filtered and carbonated, all according to the standard brewing process using the usual standard brewing procedures, equipment and materials, all of which are of general knowledge and substantially the same throughout the industry in the United States. However, such standard process is modified, according to this invention, to permit the addition of hop extract for purposes of imparting the desired distinctive hop flavor and aroma to the finished alcoholic malt beverage.

The hop extract, according to this invention, can be added to the clarified cool wort, to the clarified fermented brew before or after it is stored and aged, or to the finished alcoholic malt beverage, or can be added by any combination of such additions.

In that embodiment of this invention where the fermented brew from the fermenters or after partial or complete lagering is concentrated by freeze concentration, the hop extract can be added to the brew upstream of such concentration or downstream of such concenrtation. The hop extract is preferably added during or after reconstitution of the concentrate with water and carbon dioxide, since dilution of the concentrate would favor the solubility of some of the more difficulty-soluble extracted hop components. Where such solubility is not a problem or where there is not available equipment for adding and blending the hop extract during or after such reconstitution, the hop extract can be added to the concentrate. The freeze concentration of the fermented brew, because of the solubility-limiting conditions of concentration and temperature, has the added advantage of promoting or causing the precipitation of undesirable high molecular weight proteins, polysaccharides, and other such substances, thus obviating the necessity of boiling wort with hops for the purpose of removing such substances.

Where freeze concentration of the fermented brew is carried out, it may be accomplished batchwise, for example using a plurality of alternate ice-generators and centrifuges connected in series, or preferably, by the continuous Phillips Fractional Crystallization Process, described in Brewer's Digest, October 1961, and basically covered by U.S. Reissue No. 23,810 to J. Schmidt and U.S. Patent No. 2,854,494 to R. W. Thomas. In the Phillips Process, the brew is continuously cooled to produce a slurry of ice crystals and mother liquor, the crystals are melted and at least a portion of the melt is passed in countercurrent contact with the crystals, and the mother liquor or concentrate is separated from the melted ice, this continuous process preferably being carried out in a plurality of steps, e.g. three. If desired, the concentrate which is produced by the freeze concentration step can be filtered to remove any precipitated materials not removed with the melted ice. Suitable apparatus for carrying out the concentration of the fermented brew by a continuous process is that shown in U.S. patents to Schmidt and Thomas. Schmidt's process involves moving a mixture of crystals and adhering liquid through a liquid removal zone, a reflux zone and a melting zone, removing liquid in said liquid removal zone, melting crystals in said melting zone, withdrawing part of the melt from the melting zone and forcing another part of the melt in a direction countercurrent to the movement of crystals in said reflux zone. In Thomas' process (which is an improvement over the separation of the type disclosed by Schmidt), the solids in the purification zone are countercurrently contacted with a pulsating flow of reflux liquid by application against the melt of pulsating pressure generated by a pulse pump, the pulsation of the reflux liquid occurring during sustained application of force to the crystals to feed the same into the liquid removal zone.

An important advantage of this invention is that its practice permits a brewer to prepare from a single brew recipe a host of fermented malt beverages having various degrees of hop aroma and taste. In many parts of the world and, for that matter, in different parts of the United States, there are significantly different perferences for hop flavor and aroma. In Europe, for example, beers are hopped more heavily than in the United States. In the United States beers are often hopped more heavily in the East, particularly the northeastern part of the United States, than in the Southwest, such as Arizona and Texas. In conventional brewing practices, it is necessary to use a different brewing recipe, i.e., a recipe with a certain amount of hops, to prepare each one of the several different regional brews. However, in the practice of this invention the same brew recipe can be used to prepare the several regional brews, since it is not essential in this invention to boil wort with hops. The addition of the hop extract, according to this invention, can be controlled far easier and the different levels of hop flavor and aroma satisfied.

As an example of this invention, a malt mash is prepared by doughing in a mash tub 75 pounds of malt per barrel of water at 40° C. The mash is stirred for 10 minutes and allowed to rest for 30 minutes. A cereal adjunct mash is prepared by doughing in a cereal cooker 60 pounds of corn grits per barrel of water at 40° C. The adjunct mash is allowed to rest 30 minutes and then heated with steam to boiling for 15 minutes. The boiling adjunct mash is pumped into the main mash tub, raising the temperature therein to 72° C., at which temperature the mash is held for 20 minutes. Thereafter, the combined mash is heated with steam to a mash-off temperature of 80° C. and allowed to settle for 30 minutes. The settled mash is then run into a lautering tub where it is filtered on a bed of malt husks at 78–68° C., the first wort filtrate being recycled to the tub until clear and thereafter the filtrate being passed to a brew kettle. The filtered spent grains, containing 80 percent liquid and residual extract, is sparged with hot water. The washings are added to the wort in this brew kettle to provide a finished wort having an extract of 12° Balling. The wort in the brew kettle is boiled for one hour to yield a wort having 12.5° Balling and then passed through a Bandelot cooler. Cooled wort, at 7° C., is passed to a hold tank. The cooled wort is filtered through a diatomaceous earth filter bed and the filtrate passed to a tank where it is aerated with sterile air and pitched at 7° C. with 1 pound of liquid bottom yeast per barrel. The brew is then passed to fermentation tanks where its temperature is allowed to rise to 12° C., at which point it is cooled to 7° C. and held at this temperature for 8 days to complete fermentation. The brew is cooled to 4° C. and the young beer with an extract of 3.6° Balling is decanted from the yeast, cooled to 0° C., and passed to storage where it is held for 2 weeks to allow it to clarify and age. The aged beer is decanted and filtered over a diatomaceous earth filter bed. Chillproofing agent is added to filtered beer and it is carbonated. Hop extract is added to the carbonated beer by injecting the extract into the beer line with a proportioning device as it passes into cellar storage tanks, the amount of extract added being sufficient to provide the finished beer with 275 p.p.m. of hop resin and 0.3 p.p.m. of hop oil. The beer is aged in the cellar storage tanks for two weeks and finally filtered to produce a beer having an alcohol content of 3.65 weight percent, a specific gravity of 1.01315, an apparent extract of 3.36 percent, and a real extract of 4.99 percent.

As another example, the young beer prepared as described in the above example is freeze concentrated according to the Phillips Process, to remove 75 weight percent water, as follows. The young beer is cooled to $-4.4°$ C. to form a slurry of ice in mother liquor, the slurry (50 percent solids) is passed to a first crystal separation column to separate the ice crystals, the mother liquor is cooled to $-10.8°$ C. to form a second slurry of ice crystals, the latter slurry (50 percent solids) is passed to a second crystal separation column to separate ice crystals, and the resulting mother liquor withdrawn as a concentrate. The concentrate is filtered and passed to a storage tank. The concentrate is withdrawn from the latter tank and reconstituted with water and carbon dioxide to produce a reconstituted beer having an alcohol content of 3.65 weight percent, and during the reconstitution sufficient hop extract is metered into the beer by a proportioning device to incorporate 275 p.p.m. hop resins and 0.3 p.p.m. hop oil.

Various modifications and alterations of this invention will become apparent to those skilled in the art from the foregoing description, without departing from the scope and spirit of this invention, and it should be understood that this invention is not to be limited unduly to that set forth herein for illustrative purposes.

I claim:

1. In a process for preparing a fermented malt beverage, wherein a wort is boiled in a brew kettle, the resulting boiled wort is cooled and fermented, the resulting fermented brew is freeze concentrated, and the resulting concentrate is reconstituted with water and carbon dioxide to produce said beverage, the improvement comprising imparting desired hop flavor and aroma to said beverage solely by the addition of hop extract to the concentrate.

References Cited

UNITED STATES PATENTS

| | | | |
|---|---|---|---|
| 156,802 | 11/1874 | Lawrence | 99—31 |
| 2,685,783 | 8/1954 | Denscheidt et al. | 99—31 |
| 3,222,181 | 12/1965 | Hoelle et al. | 99—50.5 |

FOREIGN PATENTS 855,401    11/1958    Great Britain.

A. LOUIS MONACELL, *Primary Examiner.*

D. M. NAFF, *Assistant Examiner.*